United States Patent
Zhang et al.

(10) Patent No.: US 8,115,396 B2
(45) Date of Patent: Feb. 14, 2012

(54) LIGHT EMITTING DIODE LAMP PROTECTING CIRCUIT

(75) Inventors: Da-Peng Zhang, Shenzhen (CN); Chin-Long Ku, Taipei Hsien (TW)

(73) Assignees: Fu Zhun Precision Industry (Shen Zhen) Co., Ltd., Shenzhen, Guangdong Province (CN); Foxconn Technology Co., Ltd., Tu-cheng, New Taipei (TW)

( * ) Notice: Subject to any disclaimer, the term of this patent is extended or adjusted under 35 U.S.C. 154(b) by 390 days.

(21) Appl. No.: 12/558,603

(22) Filed: Sep. 14, 2009

(65) Prior Publication Data
US 2011/0018446 A1  Jan. 27, 2011

(30) Foreign Application Priority Data

Jul. 21, 2009  (CN) .......................... 2009 1 0304586

(51) Int. Cl.
*H05B 37/00* (2006.01)
*H05B 41/00* (2006.01)
(52) U.S. Cl. ......... 315/128; 315/127; 315/289; 315/291

(58) Field of Classification Search .................. None
See application file for complete search history.

(56) References Cited

U.S. PATENT DOCUMENTS
2010/0253245 A1 * 10/2010 Du et al. .................... 315/310
2011/0002069 A1 * 1/2011 Yamano et al. ............. 361/18
* cited by examiner

*Primary Examiner* — Anh Tran
(74) *Attorney, Agent, or Firm* — Altis Law Group, Inc.

(57) ABSTRACT

An LED lamp protecting circuit includes an LED lamp, a constant current source and a buffer circuit. The constant current source includes positive and negative input terminals, positive and negative output terminals and a switch. The buffer circuit is connected between the negative output terminal and the LED lamp. The buffer circuit includes a charging capacitor, a first NPN transistor and a second PNP transistor. An emitting electrode of the second transistor is connected to the LED lamp. A collecting electrode of the second transistor is connected to the negative output terminal. The charging capacitor is connected between the emitting electrode of the second transistor and a ground. A collecting electrode and an emitting electrode of the first transistor are respectively electrically connected to a base electrode of the second transistor and the ground.

11 Claims, 3 Drawing Sheets

LIGHT EMITTING DIODE LAMP PROTECTING CIRCUIT

BACKGROUND

1. Technical Field

The disclosure relates to light emitting diode lamps, and particularly to a light emitting diode lamp incorporating a protecting circuit.

2. Description of Related Art

Recently, light emitting diodes (LEDs) have come to be widely used in a variety of LED lamps, for example, miner's lamps, street lamps, submarine lamps and stage lamps, for their low power requirement and long life. The LED lamps include different numbers of the LEDs in series connection or series-parallel connection according to different illumination requirements.

It is well known that a constant current source can supply a pre-determined constant electric current to variety of loads having resistances different from each other. Since the LED is highly sensitive to electric current and substantially insensitive to voltage, the LEDs of the LED lamps are generally driven by the constant current source to reduce variation in brightness. Referring to FIG. 2, a constant current source 10 includes positive and negative input terminals IN1, IN2 for receiving electric power from an outer power source 40, positive and negative output terminals OUT1, OUT2 for supplying an electric current to an LED lamp 12 connected therebetween, a first switch K1 for connecting or disconnecting the outer power source 40 and the constant current source 10, and a second switch K2 for connecting or disconnecting the constant current source 10 and the LED lamp 12. The LED lamp 12 includes a plurality of LEDs 13 connected in series. The constant current source 10 supplies a pre-determined constant electric current to the LED lamp 12 when the first and second switches K1, K2 are turned on.

When designing the constant current source 10, a reference load between the positive and negative output terminals OUT1, OUT2 is considered to form a best application mode for the constant current source 10. For example, the reference load has a resistance equaling to that of eighteen LEDs connected in series. Therefore, the constant current source 10 is best used for supplying the pre-determined constant electric current to the LED lamp 12 which includes eighteen LEDs 13 connected in series. Referring to FIG. 3, when the constant current source 10 is used for supplying electric current to other load, such as an LED lamp 30 which includes one LED 31 and has a resistance much smaller than the reference load, the constant current source 10 may generate an impulse current at a moment when the first and second switches K1, K2 are turned on, and the constant current source 10 supplies the pre-determined constant electric current to the LED lamp 30. However, the impulse current flowing through the LED lamp 30 may cause damage to the LED 31.

It is thus desirable to provide an LED lamp with a protecting circuit which can overcome the described limitations.

DETAILED DESCRIPTION

Figure 1:
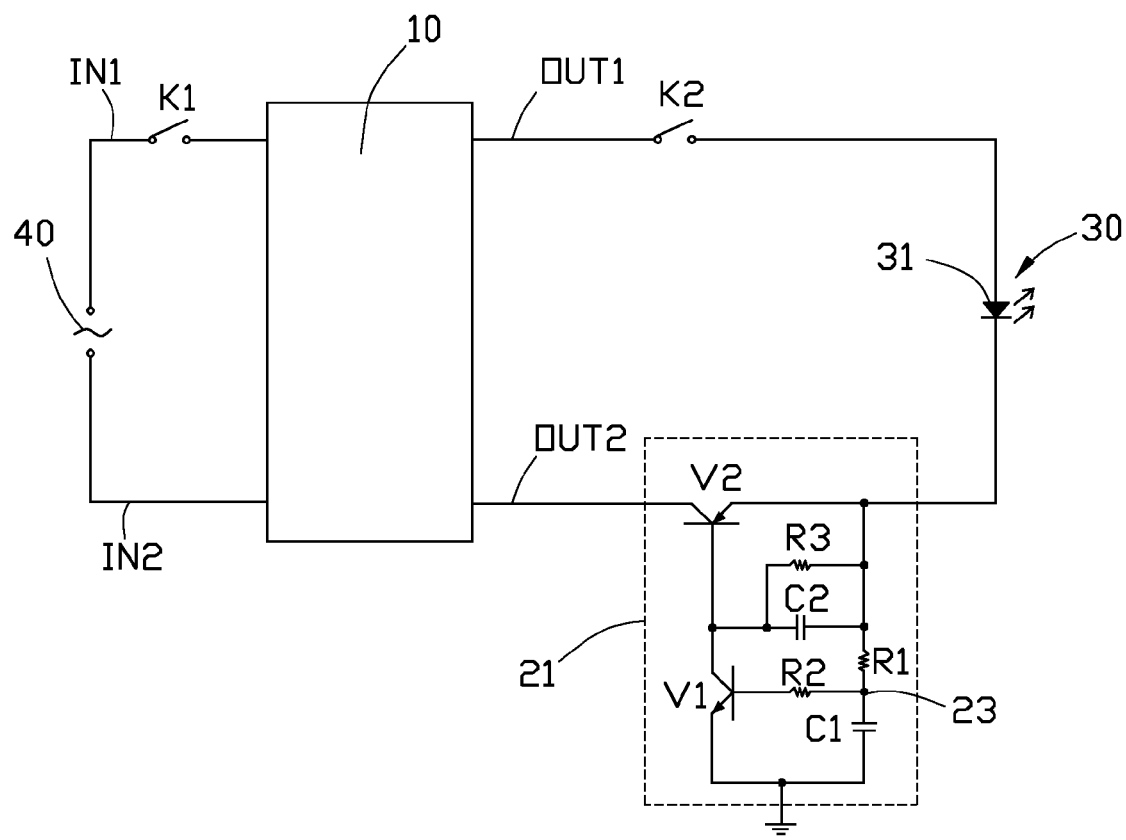
FIG. 1 is a circuit diagram of a light emitting diode (LED) lamp with a protecting circuit according to an exemplary embodiment of the present invention.
Figure 2:
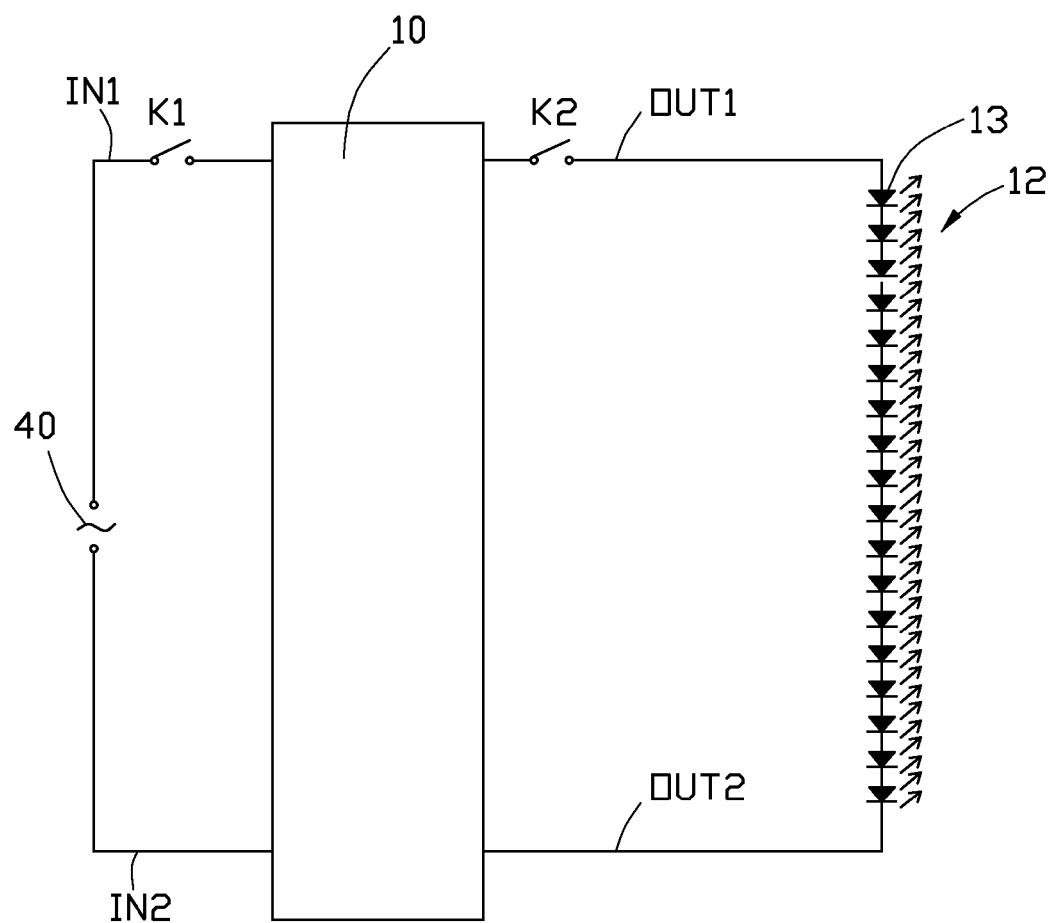
FIG. 2 is a circuit diagram showing a conventional constant current source for supplying a constant electric current to an LED lamp having a plurality of LEDs.
Figure 3:
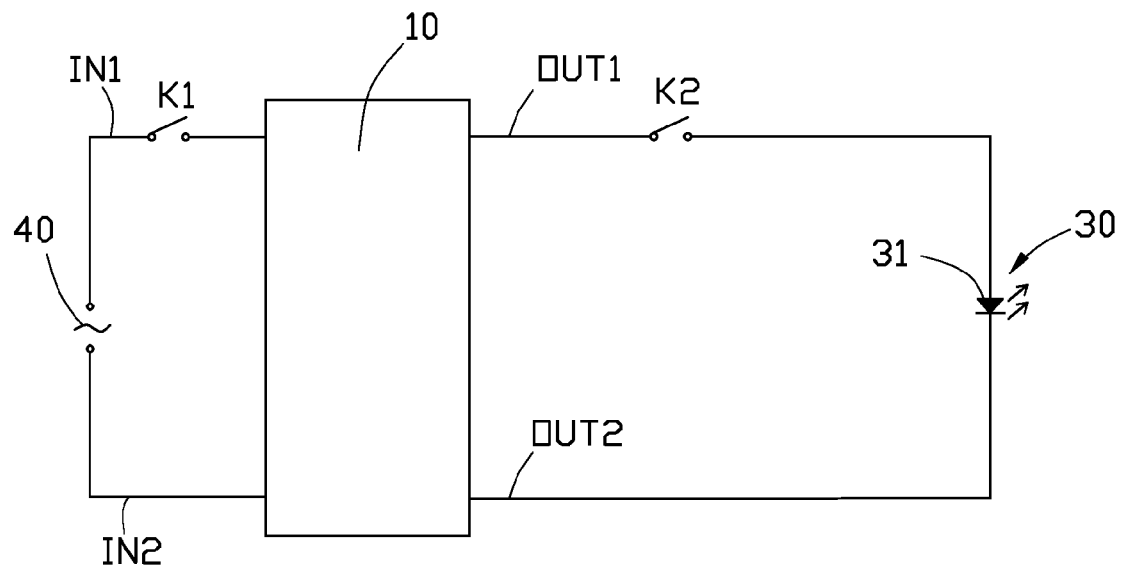
FIG. 3 is similar to FIG. 2, but shows the conventional constant current source for supplying the constant electric current to an alternative LED lamp having only one LED.

Reference will now be made to the drawing figures to describe the present light emitting diode lamp protecting circuit in detail.

FIG. 1 illustrates a light emitting diode (LED) lamp 30 having a protecting circuit for protecting the LED lamp 30 from damage when an electric current is supplied to the LED lamp 30. The LED lamp protecting circuit includes a constant current source 10 and a buffer circuit 21.

The constant current source 10 includes positive and negative input terminals N1, IN2, and positive and negative output terminals OUT1, OUT2. The positive and negative input terminals N1, IN2 connect an outer power source 40, such as 220V or 110V power source for receiving an electric power therefrom. The positive and negative output terminals OUT1, OUT2 connect the LED lamp 30 for supplying a constant electric current thereinto. The constant current source 10 is originally designed for supplying a constant electric current of 350 mA (milliampere) to an LED lamp which includes eighteen LEDs connected in series.

A first switch K1 is connected between the positive input terminal IN1 and the outer power source 40 for controlling connection or disconnection between the outer power source 40 and the constant current source 10. A second switch K2 is connected between the positive output terminal OUT2 and the LED lamp 30 for controlling connection or disconnection between the constant current source 10 and the LED lamp 30. When both of the first and second switches K1, K2 are turned on, the constant current source 10 gets electric power from the outer power source 40 and supplies the constant electric current to the LED lamp 30. Alternatively, one of the first and the second switches K1, K2 can be omitted, and the other one of the first and second switches K1, K2 can also control electrical connection or disconnection between the outer power source 40 and the LED lamp 30.

The LED lamp 30 includes one LED 31, an anode of the LED 31 is electrically connected to the positive output terminal OUT1, and a cathode of the LED 31 is electrically connected to the negative output terminal OUT2. The buffer circuit 21 is electrically connected between the cathode of the LED 31 of the LED lamp 30 and the negative output terminal OUT2.

The buffer circuit 21 includes a current-limiting resistor R1, a charging capacitor C1, a first base resistor R2, a first transistor V1, a decoupling capacitance C2, a second base resistor R3 and a second transistor V2. The first transistor V1 is a NPN transistor. The second transistor V2 is PNP transistor. An emitting electrode of the second transistor V2 is electrically connected to the cathode of the LED 31. A collecting electrode of the second transistor V2 electrically connects the negative output terminal OUT2 of the constant current source 10.

The current-limiting resistor R1 and the charging capacitor C1 are electrically connected in series between the emitting electrode of the second transistor V2 and a ground. The current-limiting resistor R1 has an input end connected to the emitting electrode of the second transistor V2, and an output end connected to an input end of the charging capacitor C1. An output end of the charging capacitor C1 is connected to the ground. The first base resistor R2 has a first end electrically connected to the output end of the current-limiting resistor R1/the input end of the charging capacitor C1 with a junction 23 formed between the current-limiting resistor R1 and the charging capacitor C1, and a second end electrically connected to a base electrode of the first transistor V1. An emitting electrode of the first transistor V1 is connected to the ground. A collecting electrode of the first transistor V1 is electrically connected to a base electrode of the second transistor V2. The second base resistor R3 has a first end electrically connected to the base electrode of the second transistor V2, and a second end electrically connected to the emitting electrode of the second transistor V2. The decoupling capacitance C2 is connected parallel to the second base resistor R3. That is, the decoupling capacitance C2 is electrically interconnected between the base electrode and the emitting electrode of the second transistor V2 as the second base resistor R3.

When the first and second switches K1, K2 are both turned on, the constant current source 10 supplies the constant electric current of 350 mA into the LED lamp 30. Since the single LED 31 of the LED lamp 30 has a resistance which is much smaller than that of the LED lamp which includes eighteen LEDs connected in series, the constant current source 10 has a tendency to output an impulse current to the single LED 31, which may damage the LED 31. However, during the moment when the first and second switches K1, K2 are turned on, the buffer circuit 21 works to avoid the impulse current to thereby protect the LED 31 from damage.

A working principle of the buffer circuit 21 will hereinafter be explained in a greater detail. During the moment when the first and second switches K1, K2 are turned on, a low potential is maintained at the base electrode of the first transistor V1. Thus, the first transistor V1 is turned off. When the first transistor V1 is turned off, a high potential is maintained at the base electrode of the second transistor V2. Thus, the second transistor V2 is turned off. That is, the first transistor V1 and the second transistor V2 of the buffer circuit 21 are both turned off at the moment when the first and second switches K1, K2 are turned on. Therefore, the collecting electrode of the second transistor V2 which electrically connects the negative output terminal OUT2 and the emitting electrode of the second transistor V2 which electrically connects the cathode of the LED 31 are non in electrical connection. An open loop is formed between the positive output terminal OUT1 and the negative output terminal OUT2 of the constant current source 10 during the moment. Thus no impulse current flows through the LED lamp 30 to damage the LED 31 connected between the positive output terminal OUT1 and the negative output terminal OUT2 of the constant current source 10. Simultaneously, during this moment, the charging capacitor C1 of the buffer circuit 21 is charged by the outer power source 40 via the constant current source 10.

After a predetermined period of time is elapsed, a voltage on the charging capacitor C1 is higher than a threshold voltage of the first transistor V1. Thus the first transistor V1 is turned on. When the first transistor V1 is turned on, the collecting electrode and the emitting electrode of the first transistor V1 are in electrical connection. Since the emitting electrode of the first transistor V1 is connected to the ground directly, a low potential is formed at the base electrode of second transistor V2, and the second transistor V2 is turned on. When the second transistor V2 is turned on, the collecting electrode and the emitting electrode of the second transistor V2 are in electrical connection. Accordingly, a closed loop is formed between the positive and negative output terminals OUT1, OUT2 of the constant current source 10. From this moment, the constant current source 10 works at a stable working stage for supplying the constant electric current of 350 mA into the LED lamp 30. Simultaneously, an electrical connection is formed between the cathode of the LED 31 and the negative output terminal OUT2 after the second transistor V2 is turned on, which means that the buffer circuit 21 has no electric consumption during the stable working stage of the constant current source 10.

In the buffer circuit 21, the lapse of period of time before the LED 31 is electrically connected with the OUT2 of the constant current source 10 is determined by a resistance value of the current-limiting resistor R1, a capacitance value of the charging capacitor C1 and a resistance value of the first base resistor R2. Thus, the lapse of period of time can be controlled in a reasonable range by changing the resistance values of the current-limiting resistor R1 and the first base resistor R2 and the capacitance value of the charging capacitor C1, such that the constant current source 10 can enter into the stable working stage timely. In this embodiment, the current-limiting resistor R1 is 47K (kilohm), the charging capacitor C1 is 330 μF (microfarad), and the first base resistor R2 is 1K. The second base resistor R3 is used for avoiding a short circuit between the positive output terminal OUT1 and the ground after the first transistor V1 is turned on. Furthermore, the second base resistor R3 can ensure the low potential formed at the base electrode of the second transistor V2 to make the second transistor V2 to turn on correctly. The decoupling capacitance C2 is used to decouple active elements (i.e., the first and the second transistors V1, V2) of the buffer circuit 21 from other part of the LED lamp protecting circuit. Thus, noise caused by the active elements is shunted through the decoupling capacitance C2, reducing an effect of the active elements on the other part of the LED lamp protecting circuit. In this embodiment, the second base resistor is 220K, and the decoupling capacitance is 22 μF.

Accordingly, the LED lamp protecting circuit including the buffer circuit 21 can delay the closed loop formed between the positive and negative output terminals OUT1, OUT2 of the constant current source 10 after the first and second switches K1, K2 are turned on. Thus, the constant current source 10 is adopted for supplying a constant electric current to the LED lamp which may include a different number of LED(s).

It is to be understood, however, that even though numerous characteristics and advantages of the disclosure have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An LED lamp protecting circuit comprising:
    an LED lamp comprising at least one LED;
    a constant current source comprising positive and negative input terminals for receiving electric power from an outer power source, positive and negative output terminals for supplying electric current to the LED lamp connected therebetween, and a switch for controlling electric connection or disconnection between the outer power source and the LED lamp; and
    a buffer circuit connected between the negative output terminal and the LED lamp, the buffer circuit comprising a charging capacitor, a first transistor and a second transistor, wherein the first transistor is NPN transistor, the second transistor is PNP transistor, an emitting electrode of the second transistor is connected to the LED lamp, a collecting electrode of the second transistor is electrically connected to the negative output terminal, the charging capacitor has a first end electrically connected to the emitting electrode of the second transistor and a second end connected to a ground, a base electrode of the first transistor is electrically connected to the first end of the charging capacitor, a collecting electrode of the first transistor is electrically connected to a base electrode of the second transistor, and an emitting electrode of the first transistor is connected to the ground.

2. The LED lamp protecting circuit as described in claim 1, wherein at a moment the switch being turned on, the first and second transistors being both turned off, an open loop formed between the positive and negative output terminals, the charging capacitor being charged by the constant current source, by a lapse of a predetermined period of time after the moment, a voltage on the charging capacitor being higher than a specific value, the first and second transistors being turned on one after the other, a closed loop formed between the positive and negative output terminals, the constant current source supplying a constant electric current to the LED lamp.

3. The LED lamp protecting circuit as described in claim 2, wherein the specific value is a threshold voltage value of the first transistor.

4. The LED lamp protecting circuit as described in claim 2, wherein the buffer circuit further comprises a current-limiting resistor, a first base resistor and a second base resistor, the current-limiting resistor is connected between the emitting electrode of the second transistor and the first end of the charging capacitor, the first base resistor is connected between the first end of the charging capacitor and the base electrode of the first transistor, and the second base resistor is connected between the base electrode and the emitting electrode of the second transistor.

5. The LED lamp protecting circuit as described in claim 4, wherein the buffer circuit further comprises a decoupling capacitor, and the decoupling capacitor is electrically connected between the base electrode and the emitting electrode of the second transistor.

6. The LED lamp protecting circuit as described in claim 2, wherein by the lapse of a predetermined period of time after the moment that the switch is turned on, the emitting electrode and the collecting electrode of the second transistor is electrically connected, and the buffer circuit has no electric consumption from the constant current source.

7. The LED lamp protecting circuit as described in claim 1, wherein the LED lamp comprises a plurality of LEDs connected in series.

8. The LED lamp protecting circuit as described in claim 1, wherein the LED lamp comprises just one LED.

9. The LED lamp protecting circuit as defined in claim 1, wherein the switch is connected between the positive out terminal and the LED lamp.

10. The LED lamp protecting circuit as defined in claim 1, wherein the switch is connected between the outer power source and the positive input terminal of the LED lamp.

11. The LED lamp protecting circuit as defined in claim 1, wherein the switch is connected between the positive out terminal and the LED lamp, and the controlling circuit further comprises a second switch connected between the outer power source and the positive input terminal of the LED lamp.

* * * * *